United States Patent [19]
Crawford et al.

[11] Patent Number: 5,568,829
[45] Date of Patent: Oct. 29, 1996

[54] BOOM CONSTRUCTION FOR SLIDING BOOM DELIMEERS

[75] Inventors: Richard H. Crawford; Brad A. Sintek; Gary M. Hamilton, Rapid City, all of S. Dak.

[73] Assignee: Lake Shove, Inc., Iron Mountain, Mich.

[21] Appl. No.: 357,110

[22] Filed: Dec. 16, 1994

[51] Int. Cl.$^6$ .............................. B27C 1/00; A01G 23/00
[52] U.S. Cl. ................... 144/24.13; 144/4.1; 144/34.1; 144/343; 212/348; 212/349; 414/718
[58] Field of Search ................... 144/4.1, 34.1, 144/24.13, 338, 339, 343; 414/718, 739, 740, 729; 212/348, 347, 349, 350; 294/88

[56] References Cited

U.S. PATENT DOCUMENTS

| | | |
|---|---|---|
| 2,896,750 | 7/1959 | Eitel . |
| 3,059,677 | 10/1962 | Busch et al. . |
| 3,308,861 | 3/1967 | Hamilton . |
| 3,351,107 | 11/1967 | Hamilton . |
| 3,371,801 | 3/1968 | Widegren . |
| 3,426,926 | 2/1969 | Witwer . |
| 3,482,611 | 12/1969 | Hamilton . |

(List continued on next page.)

FOREIGN PATENT DOCUMENTS

| | | |
|---|---|---|
| 778179 | 2/1968 | Canada . |
| 779081 | 2/1968 | Canada . |
| 835143 | 2/1970 | Canada . |
| 865489 | 3/1971 | Canada . |
| 872597 | 6/1971 | Canada . |
| 892368 | 2/1972 | Canada . |
| 918546 | 1/1973 | Canada . |
| 920482 | 2/1973 | Canada . |

(List continued on next page.)

OTHER PUBLICATIONS

CTR Model 314 Whole Tree Processor, Form #032, by CTR Manufacturing, In., Route 1, Box 254, Union Grove, North Carolina 28689.

(List continued on next page.)

Primary Examiner—W. Donald Bray
Attorney, Agent, or Firm—Peterson, Wicks, Nemer & Kamrath, P.A.

[57] ABSTRACT

An improved boom (24) for a sliding boom delimber (10) is disclosed formed from a prestressed, conventional I beam (28). A first segment of a cable bundle (70) extends from the grapple head (36) and is secured adjacent the lower flange (32) of the I beam (28). The second segment of the cable bundle (70) is inside and carried by an energy chain (74) and includes first and second, inversely related, linear portions interconnected by a third, C-shaped portion. A sag plate (60) is coextensive with the first segment and located on the opposite side of the first segment than the lower flange (32) for preventing the first portion from sagging and engaging the first segment. Sides (50, 52) extend from the outer edges of the I beam flanges (30, 32) for partially enclosing the energy chain (74). Supports (42, 54, 62) are provided for reinforcing the I beam flanges (30, 32), the sag plate (60), and a side plate (40) extending between the other edges of the flanges (30, 32) on the opposite side of the I beam (28) from the energy chain (74).

20 Claims, 2 Drawing Sheets

U.S. PATENT DOCUMENTS

| | | |
|---|---|---|
| 3,549,032 | 12/1970 | Krause, Jr. . |
| 3,556,183 | 1/1971 | Busch et al. . |
| 3,586,078 | 6/1971 | Hamilton et al. . |
| 3,590,760 | 7/1971 | Boyd et al. . |
| 3,596,690 | 8/1971 | Hamilton et al. . |
| 3,616,825 | 11/1971 | Kantola . |
| 3,620,272 | 11/1971 | Eriksson et al. . |
| 3,635,266 | 1/1972 | Eriksson . |
| 3,659,636 | 5/1972 | Erikksson et al. . |
| 3,687,323 | 8/1972 | Pingon . |
| 3,690,351 | 9/1972 | Strickland et al. . |
| 3,724,518 | 4/1973 | Zehavi et al. . |
| 3,735,786 | 5/1973 | Vit . |
| 3,796,241 | 3/1974 | Golob et al. . |
| 3,797,540 | 3/1974 | Propst . |
| 3,797,541 | 3/1974 | Kurelek et al. . |
| 3,838,721 | 10/1974 | Golob et al. . |
| 3,894,568 | 7/1975 | Windsor . |
| 3,905,407 | 9/1975 | Guy et al. . |
| 3,913,756 | 10/1975 | Barron et al. . |
| 3,974,866 | 8/1976 | Saarenketo . |
| 3,987,826 | 10/1976 | McKenzie . |
| 4,023,603 | 5/1977 | Jasinski et al. . |
| 4,034,785 | 7/1977 | Tucek . |
| 4,093,047 | 6/1978 | Wampfler . |
| 4,098,311 | 7/1978 | Larsson . |
| 4,124,047 | 11/1978 | Dressler et al. . |
| 4,130,151 | 12/1978 | Ericsson . |
| 4,194,542 | 3/1980 | Eriksson . |
| 4,219,057 | 8/1980 | Falk . |
| 4,257,461 | 3/1981 | Wangeby . |
| 4,276,918 | 7/1981 | Siqouin . |
| 4,413,661 | 11/1983 | Marchildon . |
| 4,428,407 | 1/1984 | Bourbeau . |
| 4,515,192 | 5/1985 | Eriksson . |
| 4,522,239 | 6/1985 | Gaitten . |
| 4,582,104 | 4/1986 | Siqouin . |
| 4,850,405 | 7/1989 | Johnson et al. . |
| 4,919,175 | 4/1990 | Samson . |
| 4,972,890 | 11/1990 | Isley . |
| 4,974,648 | 12/1990 | Propst . |
| 5,083,594 | 1/1992 | Côté . |
| 5,148,843 | 9/1992 | Côté . |

FOREIGN PATENT DOCUMENTS

| | | |
|---|---|---|
| 936450 | 11/1973 | Canada . |
| 967079 | 5/1975 | Canada . |
| 982455 | 1/1976 | Canada . |
| 986821 | 4/1976 | Canada . |
| 1055366 | 5/1979 | Canada . |
| 1083016 | 8/1980 | Canada . |
| 1126627 | 6/1982 | Canada . |
| 1191430 | 8/1985 | Canada . |
| 1964453 | 7/1971 | Germany . |
| 2430113 | 1/1975 | Germany . |
| 2606179 | 8/1976 | Germany . |
| 491471 | 2/1976 | U.S.S.R. . |
| 727430 | 4/1980 | U.S.S.R. . |
| 736908 | 5/1980 | U.S.S.R. . |
| 899350 | 1/1982 | U.S.S.R. . |
| 1482795 | 5/1989 | U.S.S.R. . |

OTHER PUBLICATIONS

CTR–Model 40, CTR–Model 42 Slasher, CTR–Model 42 with Wheel & Butt Board Option, CTR–Model 42 Long Body, CTR–Model 45 Slasher, CTR–Model 60–R Circular Saw Slasher, CTR–Model 1800 Firewood Processing Mill, CTR SPA–1600 Articulated Carrier (Art Car), 160 Barko on CTR SPA–1600 Art Car, and CTR–50 Maxie Saw (New), by CTR Manufacturing, Inc., Route 1, Box 254, Union Grove, North Carolina 28689.

One Piece Boom Delimber DM3000, by Denharco, 5110 Beaudry Street St. Hyacinthe, Quebec, Canada J2S 8A2.

Thunderbird Delimbers The New Technology You Want At A Price You Can Afford; A Full Length Ahead DM3500, by Ross Corporation, Eugene, OR or Chehalis, WA.

Denis Delimbers D–3000, DM–3000, by Denis Equipment, Inc., 5110 Beaudry Street, St. Hyacinthe, Quebec, Canada J2S 8A2.

Harvester Conversion, N1715–US 41, John Deere 490–E, by Fabtek Incorporated, Menominee, Michigan 49858.

Tree Length Processor, HTL 300/F, 489, by Hahn Machinery, Inc., P.O. Box 220, Two Harbors, Minnesota 55616.

Harricana Delimbers, Delimber Processors, CFA–3/87, by Harricana Metal, Inc., P.O. Box 550, Amos, Quebec, Canada J9T 3A8.

Lim–Mit Roll Stroke & Stroke Delimbers, Specifications for the LM2000, LM2100, LM2200B & LM2300, by Risley Equipment Ltd., 9024–108 Street, Grande Prairie, Alberta T8V 4C8 Canada.

Lim–mit LM2200 Roll Stroke Delimber, by Risley Equipment, Ltd., 9024–108 Street, Grande Prairie, Alberta T8V 4O8 Canada.

Link–Belt Construction Equipment, LS–2700, LS–2800, LS–3400 Logmaster C Series II Delimbers, ©1994, by Link–Belt Construction Equipment Company, Lexington, Kentucky.

Hydraulic Tree Harvester, HTH 20, HTH 26, by Pierce Mechanized Forestry International, 18201 S. W. Boones Ferry Road, Tualatin, Oregon 97062.

Valmet 500T, Steep Terrain Single Grip Harvester, 0090–0083 Jan. 1993, by Valment Logging Americas, Inc., 103 North 12th Street, P.O. Box 401, Gladstone, Michigan 49837–0401.

Valmet 911, Single Grip Harvester, by Valmet Logging AB, Box 7124, S 907 04 UMEÅ, Sweden.

Pro Pac Delimbers and Wood Processors, Model PP42 or PP48 or optional Model 453 or 513, by Pro Pac Industries, 415, route Kennedy, Liniére (Qué.), GOM 1J0.

Pro Pac Delimbers and Wood Processors, Model PP393, PP453, PP513, by Pro Pac Industries, 415, route Kennedy, Liniére (Qué.), GOM 1J0.

Energy Chains System E 4, Series 40, Series 41, Series R 88, Igus® Energy Chain Systems, pp. 107–108.

Timberline Model ST 3530, Right on track . . . , by Timberline Equipment Inc., 751 East Disk Drive, Rapid City, SD 57701.

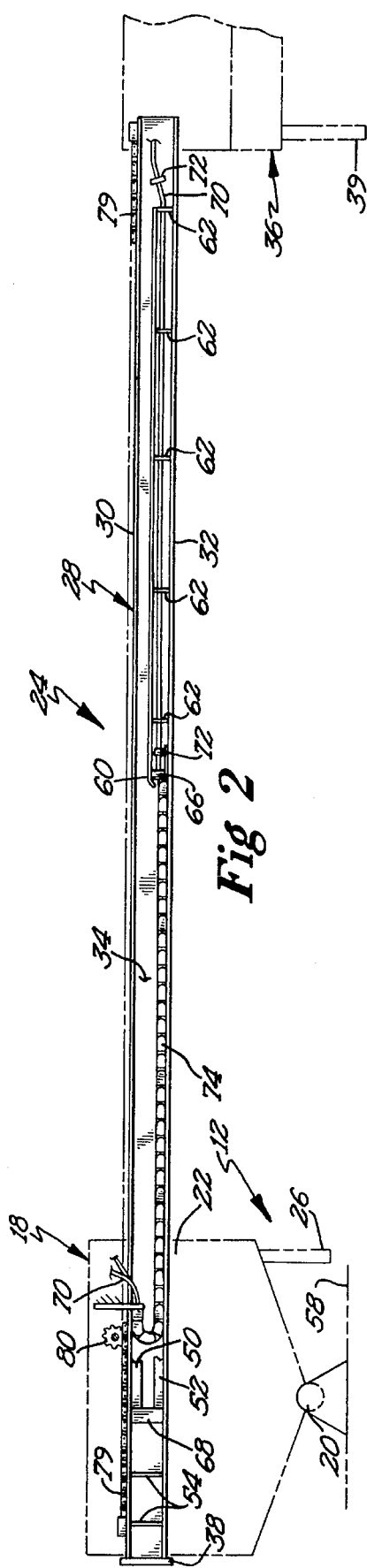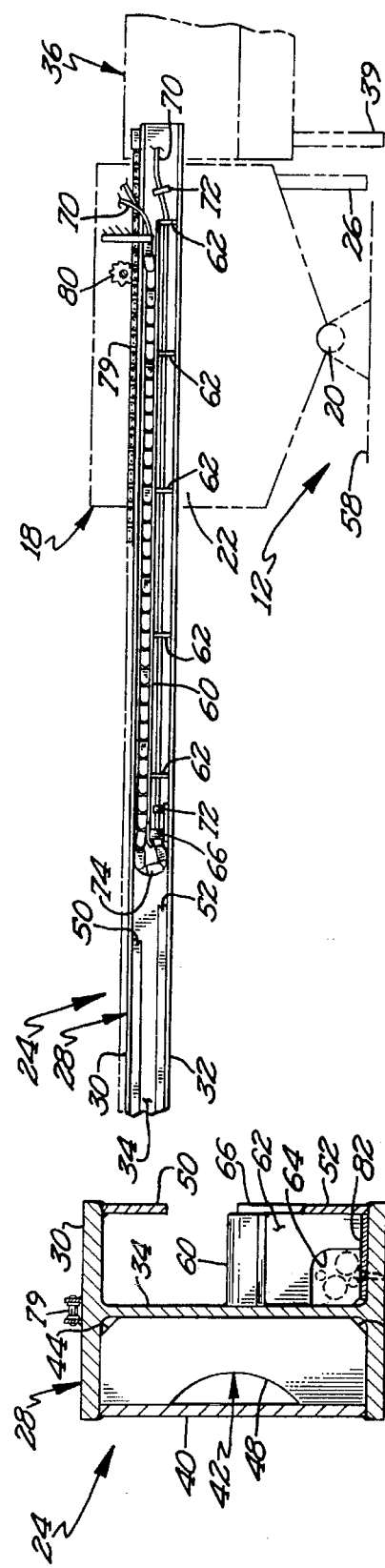

BOOM CONSTRUCTION FOR SLIDING BOOM DELIMBERS

BACKGROUND

The present invention generally relates to material handling devices, particularly to sliding boom delimbers, and specifically to improved boom constructions for sliding boom delimbers.

Sliding boom delimbers have been found to provide fast and efficient delimbing, cutting and stacking of timber stems. However, sliding boom delimbers encounter various problems inherent in their design and operation. Specifically, the boom is subjected to considerable bending moment especially when the boom is slid to its fully extended position. This bending moment is increased due to several factors including but not limited to increasing lengths of the boom, increasing complexity and thus weight of the grapple head, and the desire to work on larger timber stems both in length and in diameter. Thus, a need exists for improved boom constructions which are able to handle this increased bending moment while minimizing boom complexity and cost.

Furthermore, due to the continually changing spacing of the grapple head from the power source, a need exists for improved boom constructions which are able to provide a cable bundle between the grapple head and the power source which minimizes boom complexity and costs and which encloses the cable bundle from catching on external objects and protects the cable bundle from excessive wear or damage.

SUMMARY

The present invention solves these and other needs and problems in the field of sliding boom delimbers by providing, in the most preferred form, an improved boom construction formed from an I beam including a first flange having first and second edges, a second flange having first and second edges, and an interconnecting web integrally formed with and extending generally perpendicular between the first and second flanges intermediate their first and second edges, with the grapple head being securable to the forward end of the I beam and a stop being secured to the rear end of the I beam.

In a further aspect of the present invention, a cable bundle includes a first segment having a first end connected to the grapple head and secured to the boom and a second segment including a first portion extending from a stationary connection to the power source and a second portion extending from the interconnection with the first segment, and a C-shaped third portion extending between the first and second portions, with the lengths of the first and second portions being inversely related.

It is thus an object of the present invention to provide a novel sliding boom delimber.

It is further an object of the present invention to provide a novel boom construction for sliding boom delimbers.

It is further an object of the present invention to provide such a novel sliding boom construction formed from an I beam.

It is further an object of the present invention to provide such a novel sliding boom construction not requiring tension cables.

It is further an object of the present invention to provide such a novel sliding boom construction which protects the cable bundle to the forward end of the boom.

It is further an object of the present invention to provide such a novel sliding boom construction which minimizes boom complexity and cost.

It is further an object of the present invention to provide such a novel sliding boom construction able to withstand relatively large bending loads without destructive deformation.

It is further an object of the present invention to provide such a novel sliding boom construction reducing the overall height of the delimber.

It is further an object of the present invention to provide such a novel sliding boom construction which encloses the cable to keep them from becoming entangled in obstructions.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows a front elevational view of the improved boom construction of FIG. 1 in its fully extended position, with portions being shown in phantom for illustration.

FIG. 3 shows a cross sectional view of the improved boom construction of FIG. 1 according to section line 3—3 of FIG. 1.

FIG. 4 shows a front elevational view of the improved boom construction of FIG. 1 in its fully retracted position, with portions being shown in phantom for illustration.

Figure 1:
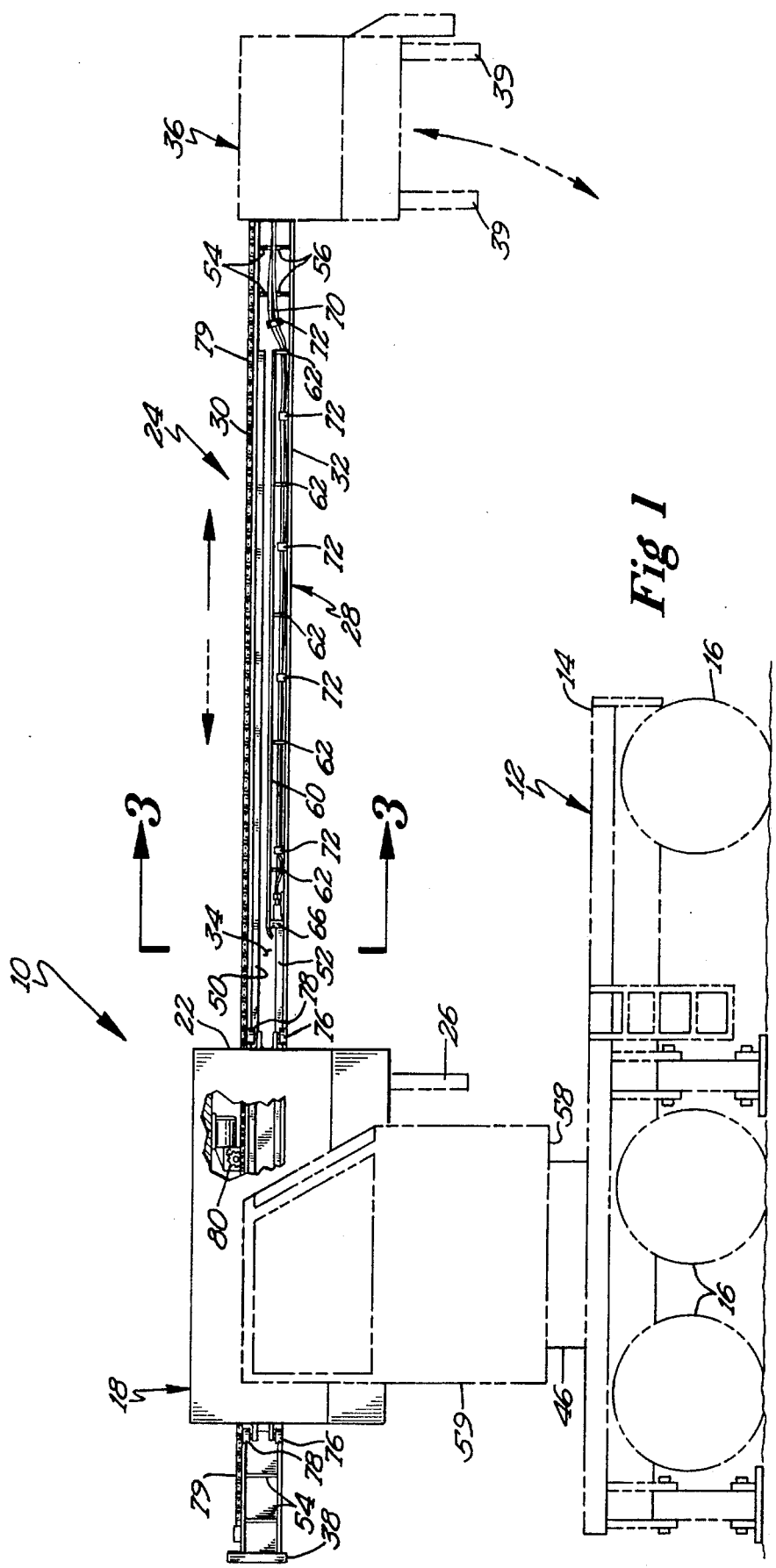
FIG. 1 shows a front elevational view of a sliding boom delimber utilizing the improved boom construction according to the preferred teachings of the present invention, with portions being broken away and shown in phantom for illustration.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top" "bottom" "first" "second" "inside" "outside" "front" "back" "outer" "inner" "upper" "lower" "height" "width" "length" "end", "side", "horizontal", "vertical", "rear", "forward", and similar terms are used herein, it should be understood that these terms have reference only to the structure shown in the drawings as it would appear to a person viewing the drawings and are utilized only to facilitate describing the invention.

DESCRIPTION

A sliding boom delimber having an improved sliding boom according to the preferred teachings of the present invention is shown in the drawings and generally designated 10. Generally, delimber 10 includes a carrier unit 12 which in the most preferred form is of the type shown and claimed in U.S. Pat. No. 4,565,486. In particular, unit 12 includes a platform 58 upon which a cab 59 and a power source are mounted. A turntable 46 is secured between the frame 14 and platform 58 to allow relative rotation therebetween. It can be appreciated that frame 14 can include provisions allowing the base portion of turntable 46 to be pivoted about longitudinal and/or lateral axes. Frame 14 can be suitably supported for movement on the terrain by suitable means such as by rubber tires 16. However, it can be appreciated that other forms of movable support can be utilized including but not limited to tracks.

Delimber 10 further generally includes a material handling device 18 mounted to platform 58 and in the most preferred form pivotably mounted about a lateral axis 20 to platform 58. It can then be appreciated that material handling device 18 can be mounted to platform 58 and/or frame 14 in a variety of manners according to the teachings of the present invention. Device 18 generally includes a tunnel 22 of a size and shape for slideably receiving a sliding boom 24. Tunnel 22 can be of a variety of types and forms and typically will include suitable grapple and delimbing arms 26 pivotably mounted about a longitudinal axis adjacent to the forward end thereof. Tunnel 22 may also include other material handling apparatus such as feed rollers mounted thereto. It can be appreciated that the material handling apparatus could alternately be mounted at other locations including but not limited to the mounting construction for tunnel 22, platform 58, or the like. A grapple head 36 which can be of conventional design is suitably secured and mounted to the forward end of boom 28 and a rear stop 38 is suitably secured and mounted to the rear end of boom 28. Suitable bumpers can be provided to prevent destructive abutment of head 36 and stop 38 with tunnel 22. Grapple head 36 typically will include suitable grapple and delimbing arms 39, a topping saw, and other material handling apparatus.

Boom 24 according to the teachings of the present invention is formed from a conventional I beam 28 including a top flange 30, a bottom flange 32, and an interconnection web 34 integrally extending generally perpendicular to flanges 30 and 32 and intermediate their edges. In the most preferred form, the widths of flanges 30 and 32 or in other words the spacing between the first and second edges of flange 30 and between the first and second edges of flange 32 are equal. Further, flanges 30 and 32 are generally horizontally orientated with flange 30 located vertically above flange 32. Furthermore, in the most preferred form, I beam 28 is prestressed during formation in a manner which resists downward deflection.

Boom 24 further includes a side plate 40 of a length generally equal to the length of I beam 28 and a height for receipt between flanges 30 and 32. In the most preferred form, side plate 40 is secured such as by welding to the left side of I beam 28 having an outer extent equal to the lateral extent of flanges 30 and 32. For reinforcing flanges 30 and 32 and side plate 40, generally rectangular shaped plate supports 42 are provided secured to I beam 28 and abutting with and extending perpendicular from flanges 30 and 32, web 34, and plate 40. Plate supports 42 have a height generally equal to the spacing between the inside surfaces of flanges 30 and 32 and a width generally equal to the spacing between the inside surfaces of web 34 and side plate 40. The inner corners of plate supports 42 at the intersection of flanges 30 and 32 with web 34 each include a chamfer 44 to allow a tight fit. Further, the outer edges of plate supports 42 which abut with side plate 40 and which extend generally perpendicular to flanges 30 and 32 include a generally arcuate cutout 48 intermediate flanges 30 and 32.

Boom 24 further includes top and bottom tray sides 50 and 52 having an outer extent equal to the lateral extent of the edges of the right side of flanges 30 and 32. In particular, sides 50 and 52 each have a height substantially less than ½ of the spacing between flanges 30 and 32 and in the most preferred form approximately ¼ of the spacing between flanges 30 and 32. Further, side 50 has a length less than the length of I beam 28 and in the preferred form about 80% of the length of I beam 28, with side 50 located intermediate the forward and rear ends of I beam 28. Side 52 extends generally from a point intermediate the forward and rear ends of side 50 and I beam 28 to the rear end of side 50. Top tray side 50 extends generally perpendicularly from the outer edge of flange 30 towards but spaced from flange 32 and tray side 52 extends generally perpendicularly from the outer edge of flange 32 towards but spaced from flange 30 and tray side 50. Generally rectangular shaped flange supports 54 are provided secured to I beam 28 abutting with and extending generally perpendicular to flanges 30 and 32 and web 34 at spaced intervals between the ends of side 50 and I beam 28. Flange supports 54 have a height generally equal to the spacing between the inside surfaces of flanges 30 and 32 and a width generally equal to the spacing between the inside surfaces of web 34 and generally the extent of the outer edges of flanges 30 and 32. The inner corners of flange supports 54 at the intersection of flanges 30 and 32 with web 34 each include a chamfer 44 to allow a tight fit. Further, the inner edges of flange supports 54 which abut with side plate 40 and which extend generally perpendicular to flanges 30 and 32 include a rectangular-shaped cutout 56. Cutouts 56 have a height equal to generally ⅓ of the height of flange supports 54 and a width equal to generally ½ of the width of flange supports 54, with cutout 56 located intermediate flanges 30 and 32. The inner corners of cutouts 54 are rounded.

Boom 24 further includes a sag plate 60 extending from the forward end of side 50 to generally intermediate the ends of side 50 and I beam 28 and the forward end of side 52. Sag plate 60 extends generally perpendicular to web 34 and is located intermediate flanges 30 and 32 and has a width generally equal to but slightly less than the outer extent of the edges of the right side of flanges 30 and 32. For reinforcing flange 32 and sag plate 60, generally rectangular shaped, half flange supports 62 are provided secured to I beam 28 and sag plate 60 abutting with and extending generally perpendicular to flange 32, web 34, and sag plate 60. Half flange supports 62 have a height generally equal to the spacing between the inside surfaces of flange 32 and sag plate 60 and a width generally equal to the spacing between the inside surfaces of web 34 and side 52. The inner corner of half flange supports 62 at the intersection of the edges which abut with flange 32 and web 34 includes a generally rectangular cut out 64 having a height slightly less than ½ of the height of half flange support 62 and a width slightly more than ½ of the width of half flange support 62. A sag plate support 66 extends between and generally parallel to the outer edges of flange 32 and sag plate 60. Sag plate support 66 is located at the rear end of sag plate 60 and adjacent the forward end of side 52. A roller support plate 68 extends between and generally parallel to the outer edges of flanges 30 and 32 and is located adjacent the rear ends of sides 50 and 52.

Boom 24 further includes a cable bundle 70 having a first end connected to grapple head 36 and a second end connected to a stationary point on tunnel 22 and in turn to the power source of carrier unit 12. Cable bundle 70 can include one or more hydraulic lines for carrying hydraulic fluid under pressure, one or more electric cords, and the like. A first segment of cable bundle 70 extends from grapple head 36 intermediate flange 32 and sag plate 60 and through cutouts 64. The first segment of cable bundle 70 is suitably clamped such as by clamps 72 to prevent relative movement of cable bundle 70 with I beam 28 from grapple head 36 to the rear end of sag plate 60 and the forward end of side 52. From sag plate 60 to the stationary point on tunnel 22, a second segment of cable bundle 70 is positioned inside and carried by an energy chain 74 such as manufactured by Igus, Inc. of E. Providence, R.I. The end of cable bundle 70 and energy chain 74 of cable bundle 70 connected to tunnel 22 is located on the opposite side of sag plate 60 than the first segment of cable bundle 70 extending through cutouts 64 of half flange supports 62. The second segment of cable bundle 70 generally includes first and second linear portions which extend parallel to flanges 30 and 32 and a C-shaped portion extending therebetween and having a diameter generally equal to the spacing between flanges 30 and 32, with the lengths of the first and second linear portions and thus the location of the C-shaped portion being variable depending upon the position of boom 24 in tunnel 22.

In the most preferred form, tunnel 22 includes front and rear pair of rollers 76 which rotatably abut with the outer edges of flange 32 and front and rear pair of rollers 78 which rotatably abut with the outer edges of flange 30. A suitable drive can be provided for slideably moving boom 24 inside of tunnel 22 such as a roller chain 79 secured to the outside surface of flange 30 which is in driving engagement with a suitably driven gear 80 mounted to tunnel 22.

Now that the basic construction of delimber 10 according to the preferred teachings of the present invention has been explained, the operation and some advantages of delimber 10 can be set forth and appreciated. Assuming for the sake of example that boom 24 is in its fully extended position with stop 38 engaging the rear end of tunnel 22 as seen in FIG. 2, it can be realized that the first linear portion of cable bundle 70 and energy chain 74 has its maximum length and is supported upon flange 32 inside of side 52 and the second linear portion of cable bundle 70 and energy chain 74 has its minimum length and is located within side 50, with the C-shaped third portion located at its maximum spacing from the rear end of sag plate 60 and the forward ends of I beam 28 and side 50. When gear 80 is driven, boom 24 will slide in tunnel 22 due to the rack and pinion drive provided between chain 79 and gear 80. As boom 24 retracts, the length of the first linear portion decreases and of the second linear portion increases with the spacing of the C-shaped portion from the forward ends of I beam 28 and side 50 decreasing. Thus, the lengths of the first and second linear portions are inversely related. When boom 24 reaches its fully retracted position with grapple head 36 engaging the forward end of tunnel 22 as best seen in FIG. 4, the first linear portion of cable bundle 70 and energy chain 74 has its minimum length and the second linear portion of cable bundle 70 and energy chain 74 has its maximum length, with the C-shaped portion located at its minimum spacing from the rear end of sag plate 60 and the forward ends of I beam 28 and side 50. It can be appreciated that sag plate 60 prevents the second linear portion of cable bundle 70 and energy chain 74 from sagging and engaging the first segment of cable bundle 70 clamped by clamps 72 to I beam 28 and located on the opposite side of sag plate 60. It can be appreciated that sides 50 and 52 generally prevent movement of energy chain 74 past the outer extent of flanges 30 and 32, with energy chain 74 having a width in the most preferred form generally equal to but slightly less than the spacing between the inside surfaces of web 34 and sides 50 and 52. In the most preferred form, a protective layer 82 is provided on flange 32 to raise the first linear portion of energy chain 74 above the slightly increased thickness of web 34 at its interconnection with flange 32 to prevent the side of energy chain 74 from rubbing thereagainst and to reduce frictional wear resulting from chain 74 formed of plastic engaging and disengaging the relatively hard surface of flange 32 formed of metal. Similar provisions could be provided on the inside surface of flange 30 and the upper surface of sag plate 60. It can then be appreciated that energy to operate grapple head 36 from the power source of unit 12 can be transferred through cable bundle 70 whatever the position of boom 24 in tunnel 22.

The improved construction of boom 24 according to the preferred teachings of the present invention is advantageous over those of prior sliding boom delimbers. In particular, it can be appreciated that boom 24 is under large bending moments especially when fully extended and while handling large trees. Thus, boom 24 must be capable of withstanding such bending moments without destructive deformation. Prior sliding boom delimbers utilized fabricated sliding booms which were strengthened by tension cables. It can then be appreciated that the use of tension cables results in several disadvantages. First, the overall height of the delimber was increased, which often makes transportation of delimbers on transport trailers under bridges or the like impossible. Further, the tension cables and hydraulic hoses, electric cables, or the like supported thereon often became entangled in tree limbs or other obstructions. Also, the fabrication from relatively large number of components and their weldment together are relatively costly. It can then be appreciated that the use of I beam 28 according to the preferred teachings of the present invention results in several advantages. First, I beam 28 provides the necessary strength such that tension cables are not required and their attendant disadvantages can be avoided. Further, I beam 28 is a purchased component reducing the fabrication required for boom 24. Further, I beams 28 can be purchased in a prestressed condition to further enhance the ability of boom 24 to withstand bending moments (without tension cables), with fabrication of prior booms not lending themselves to such prestressed condition without using tension cables.

It can also be appreciated that the particular manner of bringing power from the power source in carrier unit 12 to grapple head 36 according to the preferred teachings of the present invention results in several advantages. In particular, cable bundle 70 is positioned within a cavity and specifically in the most preferred form formed and defined by flanges 30 and 32, web 34, and sides 50 and 52 such that it is not prone to catching on objects, to being pinched such as between boom 24 and another object, or to being otherwise damaged as when it is exposed such as being slideably carried by tension cables. Further, due to its being carried by energy chain 74, cable bundle 70 is not placed under tensional stress or other types of damaging stress.

Now that the basic teachings of the present invention have been explained, many extensions and variations will be obvious to one having ordinary skills in the art. For example, in the most preferred form, boom 24 is formed from I beam 28 and cable bundle 70 is positioned within a cavity formed and defined by flanges 30 and 32 and web 34 thereof and is believed to be synergistically advantageous. However, cable bundle 70 could be otherwise supported relative to boom 24 according to the teachings of the present invention and/or cable bundle 70 could be supported according to the teachings of the present invention in other configurations of boom 24.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. An improved boom for a sliding boom delimber having a tunnel of a size and shape for slideably receiving the boom, with the delimber including a grapple head, comprising, in combination: an I beam including a first flange having first and second edges, a second flange having first and second edges, and an interconnecting web integrally formed with and extending generally perpendicular between the first and second flanges intermediate their first and second edges, with the I beam including a forward end and a rear end, with the grapple head being securable to the forward end of the I beam; and a stop secured to the rear end of the I beam to prevent withdrawal of the boom from the tunnel.

2. In the sliding boom delimber of claim 1 wherein the boom further comprises, in combination: means for reinforcing the flanges of the sliding boom.

3. In the sliding boom delimber of claim 2 wherein the reinforcing means comprises supports having a height generally equal to the spacing between the first and second flanges and a width generally equal to the spacing between the web and the edges of the first and second flanges, with the supports extending perpendicularly between the first and second flanges and to the web and abutting with the first and second flanges and the web.

4. In the sliding boom of claim 3 wherein the supports each have an edge extending generally perpendicular to the first and second flanges, with the supports further having a cut out formed in the edge intermediate the first and second flanges.

5. In the sliding boom delimber of claim 4 wherein the edges of the supports abut with the web.

6. In the sliding boom delimber of claim 3 wherein the reinforcing means further comprises, in combination: a side plate having a height generally equal to the spacing between the first and second flanges, with the side plate having an outer extent equal to the first edges of the first and second flanges, with the supports extending perpendicularly between the side plate and the web and abutting with the side plate.

7. In the sliding boom delimber of claim 6 wherein the supports each have an edge extending generally perpendicular to the first and second flanges, with the supports each further having a cutout formed in the edge intermediate the first and second flanges, with the edges of the supports abutting with the side plate.

8. In the sliding boom delimber of claim 2 wherein the reinforcing means comprise supports having a height for receipt between the first and second flanges and a width generally equal to the spacing between the web and the edges of the first and second flanges, with the support extending perpendicularly and abutting with the web and at least one of the first and second flanges.

9. In the sliding boom delimber of claim 1 wherein the boom further comprises a cable bundle including a first segment having a first end for connection to the grapple head and a second segment having a second end for connection to the tunnel, with the first segment being interconnected to the second segment at an interconnection, with the first segment being secured to the I beam intermediate the first and second flanges and generally adjacent to the second flange, with the second segment including a first portion extending from the second end and adjacent to the first flange, a second portion extending from the interconnection and adjacent to the second flange, and a C-shaped third portion extending between the first and second portions, with the distance of the third portion from the second end being inversely related to the distance of the third portion from the interconnection, with the second segment located intermediate the first and second flanges.

10. In the sliding boom delimber of claim 9 wherein the boom further comprises a sag plate located intermediate the first and second flanges and coextensive with the first segment, with the first segment located intermediate the second flange and the sag plate, with the second end located intermediate the first flange and the sag plate, with the sag plate preventing the first portion of the second segment from engaging the first segment.

11. In the sliding boom delimber of claim 9 wherein the boom further comprises first and second sides extending generally perpendicular to the first and second flanges adjacent to the first edges, with the cable bundle located intermediate the sides and the web.

12. In the sliding boom delimber of claim 11 wherein the boom further comprises an energy chain, with the second segment located within and carried by the energy chain, with the energy chain located intermediate the sides and the web.

13. In the sliding boom delimber of claim 1 wherein the tunnel includes front and rear pairs of rollers for rotatably abutting against each of the first and second edges of the first and second flanges.

14. In the sliding boom delimber of claim 1 wherein the I beam is prestressed to further enhance the ability to withstand bending loads causing downward deflection of the forward end of the I beam.

15. In a delimber including a tunnel of a size and shape for slideably receiving a boom having a forward end, with the delimber further including a grapple head secured to the forward end of the boom, an improvement comprising, in combination: a cable bundle including a first segment having a first end for connection to the grapple head and a second segment having a second end for connection to the tunnel, with the first segment being interconnected to the second segment at an interconnection, with the first segment being secured to the boom, with the second segment including a first portion extending from the second end, a second portion extending from the interconnection, and a C-shaped third portion extending between the first and second portions, with the distance of the third portion from the second end being inversely related to the distance of the third portion from the interconnection.

16. In the sliding boom delimber of claim 15 wherein the boom further comprises a sag plate located coextensive with the first segment, with the sag plate preventing the first portion of the second segment from engaging the first segment.

17. In the sliding boom delimber of claim 16 wherein the boom further comprises an energy chain, with the second segment located within and carried by the energy chain.

18. In the sliding boom delimber of claim 15 wherein the boom includes first and second, parallel flanges each having an outer edge, with the first segment being secured to the boom intermediate the first and second flanges and adjacent to the second flange inside of the outer edge, with the first portion being adjacent to the first flange inside of the outer edge, with the second portion being adjacent to the second flange inside of the outer edge, with the second segment located intermediate the first and second flanges.

19. In the sliding boom delimber of claim 18 wherein the boom further comprises first and second sides extending generally perpendicular to the first and second flanges adjacent to the outer edges, with the cable bundle located inside of the sides.

20. In the sliding boom delimber of claim 19 wherein the boom further comprises an energy chain, with the second segment located within and carried by the energy chain, with the energy chain located inside of the sides.

* * * * *